(12) United States Patent
Harthcock et al.

(10) Patent No.: US 10,583,636 B2
(45) Date of Patent: *Mar. 10, 2020

(54) SOFT TOUCH LAMINATES CONSTRUCTED WITH IMPROVED FIRE RETARDANT PROPERTIES FOR TRANSPORTATION

(71) Applicant: Schneller LLC, Kent, OH (US)

(72) Inventors: Matthew A. Harthcock, Stow, OH (US); Robert G. Pierson, Akron, OH (US); Mark D. Tennant, Cuyahoga Falls, OH (US); Donald A. Meltzer, Akron, OH (US)

(73) Assignee: SCHNELLER LLC, Kent, OH (US)

( * ) Notice: Subject to any disclaimer, the term of this patent is extended or adjusted under 35 U.S.C. 154(b) by 409 days.

This patent is subject to a terminal disclaimer.

(21) Appl. No.: 15/350,445

(22) Filed: Nov. 14, 2016

(65) Prior Publication Data
US 2017/0057210 A1    Mar. 2, 2017

Related U.S. Application Data

(63) Continuation of application No. 14/213,554, filed on Mar. 14, 2014, now Pat. No. 9,492,988.

(Continued)

(51) Int. Cl.
*B32B 27/06* (2006.01)
*B32B 27/18* (2006.01)
(Continued)

(52) U.S. Cl.
CPC .............. *B32B 27/065* (2013.01); *B32B 5/02* (2013.01); *B32B 5/18* (2013.01); *B32B 5/245* (2013.01); *B32B 7/00* (2013.01); *B32B 7/12* (2013.01); *B32B 17/04* (2013.01); *B32B 27/08* (2013.01); *B32B 27/12* (2013.01); *B32B 27/18* (2013.01); *B32B 27/20* (2013.01); *B32B 27/283* (2013.01); *B32B 27/302* (2013.01); *B32B 27/304* (2013.01); *B32B 27/34* (2013.01); *B32B 27/36* (2013.01); *B32B 27/40* (2013.01); *B32B 33/00* (2013.01); *C09J 7/21* (2018.01); *C09J 7/245* (2018.01); *C09J 7/29* (2018.01); *B32B 2255/10* (2013.01); *B32B 2255/26* (2013.01); *B32B 2260/021* (2013.01); *B32B 2262/101* (2013.01); *B32B 2264/00* (2013.01); *B32B 2264/10* (2013.01); *B32B 2264/102* (2013.01); *B32B 2266/0235* (2013.01); *B32B 2307/3065* (2013.01); *B32B 2405/00* (2013.01);
(Continued)

(58) Field of Classification Search
CPC .................................................. B32B 17/064
See application file for complete search history.

(56) References Cited

U.S. PATENT DOCUMENTS 3,723,171 A    3/1973  Fuchs
3,872,187 A *  3/1975  Fath .................. C07F 9/091
                                              524/142
(Continued)

FOREIGN PATENT DOCUMENTS

EP    0 288 733    11/1988

*Primary Examiner* — Peter F Godenschwager
(74) *Attorney, Agent, or Firm* — Hahn Loeser + Parks LLP; Scott M. Oldham, Esq.

(57) ABSTRACT

Soft touch fire retardant laminates with PVC middle layers, foamed or unfoamed, and multiblock copolymer or polyurethane or silicone top layers which meet FAA requirements are disclosed.

13 Claims, 2 Drawing Sheets

| | |
|---|---|
| Mutliblock copolymer with poly(vinyl halide) Or a poly(vinylidene halide) | 0.5-3 mils |
| Primer (optional) | 0-0.5 mil |
| PVC layer | 2-25 mils |
| Optional impregnated glass | 1-10 oz/yd2 |
| Primer (optional) | 0-0.5 mil |
| Optional poly(vinylfluoride) or a poly(vinylidene fluoride) | 0.5-3 mils |
| Optional Adhesive | 1-5 oz/yd2 |

Related U.S. Application Data

(60) Provisional application No. 61/782,907, filed on Mar. 14, 2013.

(51) Int. Cl.

| | | |
|---|---|---|
| *B32B 27/30* | (2006.01) | |
| *B32B 5/18* | (2006.01) | |
| *B32B 5/24* | (2006.01) | |
| *B32B 7/12* | (2006.01) | |
| *B32B 27/12* | (2006.01) | |
| *B32B 27/20* | (2006.01) | |
| *B32B 27/34* | (2006.01) | |
| *B32B 27/36* | (2006.01) | |
| *B32B 27/40* | (2006.01) | |
| *B32B 17/04* | (2006.01) | |
| *C09J 7/21* | (2018.01) | |
| *C09J 7/24* | (2018.01) | |
| *C09J 7/29* | (2018.01) | |
| *B32B 7/00* | (2019.01) | |
| *B32B 27/08* | (2006.01) | |
| *B32B 33/00* | (2006.01) | |
| *B32B 5/02* | (2006.01) | |
| *B32B 27/28* | (2006.01) | |

(52) U.S. Cl.
CPC ....... *B32B 2601/00* (2013.01); *B32B 2605/00* (2013.01); *B32B 2605/18* (2013.01); *C09J 2427/006* (2013.01); *Y10T 428/249981* (2015.04); *Y10T 428/249983* (2015.04); *Y10T 428/249991* (2015.04); *Y10T 428/2848* (2015.01); *Y10T 428/31544* (2015.04)

(56) References Cited

U.S. PATENT DOCUMENTS

| | | | |
|---|---|---|---|
| 4,175,154 A | * | 11/1979 | Faust .................. B32B 5/24 428/312.6 |
| 5,316,608 A | | 5/1994 | Ocampo et al. |
| 6,348,117 B1 | | 2/2002 | Tribo et al. |
| 2006/0189236 A1 | | 8/2006 | Davis et al. |
| 2008/0233365 A1 | | 9/2008 | Pierson et al. |
| 2010/0059175 A1 | | 3/2010 | Georges |
| 2010/0272976 A1 | | 10/2010 | Ashton et al. |
| 2011/0143136 A1 | | 6/2011 | Hebert et al. |
| 2012/0164445 A1 | | 6/2012 | Boyle et al. |
| 2012/0258303 A1 | | 10/2012 | Buhring et al. |
| 2013/0053493 A1 | | 2/2013 | Nakano et al. |

\* cited by examiner

| Mutliblock copolymer with poly(vinyl halide) Or a poly(vinylidene halide) | 0.5-3 mils |
|---|---|
| Primer (optional) | 0-0.5 mil |
| PVC layer | 2-25 mils |
| Optional impregnated glass | 1-10 oz/yd2 |
| Primer (optional) | 0-0.5 mil |
| Optional poly(vinylfluoride) or a poly(vinylidene fluoride) | 0.5-3 mils |
| Optional Adhesive | 1-5 oz/yd2 |

Fig. 1

| Soft Touch Film |
|---|
| Acrylic primer |
| Flame retarded PVC layer |
| Impregnated glass |

Fig. 2; construction used in examples

SOFT TOUCH LAMINATES CONSTRUCTED WITH IMPROVED FIRE RETARDANT PROPERTIES FOR TRANSPORTATION

CROSS REFERENCE TO RELATED APPLICATIONS

This application is a continuation of co-pending U.S. application Ser. No. 14/213,554 filed Mar. 14, 2014, which in turns claims the benefit of U.S. Provisional Application No. 61/782,907, filed Mar. 14, 2013, all of which are incorporated herein by reference.

FIELD OF THE INVENTION

The present invention relates to multi-layered laminates for use in surface covering applications having improved fire retardant properties. These materials have the look and feel of leather with a greater resistance to burning than presently available soft touch laminates.

BACKGROUND OF THE INVENTION

While "Soft-Touch"/"Soft-Feel" leather like materials are well known in the art, the traditional products have undesirable burn properties when used in commercial transportation (for upholstering or covering surfaces; i.e. they readily burn and/or give off toxic fumes/smoke. Current "soft-touch" products for general use (automotive, consumer products, etc.) readily burn or melt and produce toxic smoke. In commercial aviation there are even fewer options; due to the stringent regulatory requirements designed to protect passenger safety in the event of a fire. Synthetic leathers make up the majority of what is used. These often have marginal burn properties which limits where and how they can be used. Additionally many have poor durability and stain easily.

The art has tried to address this by using fire resistant silicones. Silicone products have been developed that can be used for a soft feel and some of them can meet aviation requirements. However these silicones feel "sticky" or "tacky" and while soft, are generally not mistaken for leather. Additionally, because of the stickiness, silicones can pick up and retain dirt and stains.

Further, other soft feel products do not have great damage resistance/durability rendering them unsuitable for high wear areas such as aircraft or other interiors or had a soft feel but lacked the compressive quality or could not pass the burn requirements.

DESCRIPTION OF THE DRAWING FIGURES

FIG. 1 is a schematic representation of a first embodiment of a laminate of the present disclosure;

FIG. 2 is a schematic representation of a second embodiment of a laminate of the present disclosure;

DETAILED DESCRIPTION OF PREFERRED AND ALTERNATE EMBODIMENTS

Figure 3:
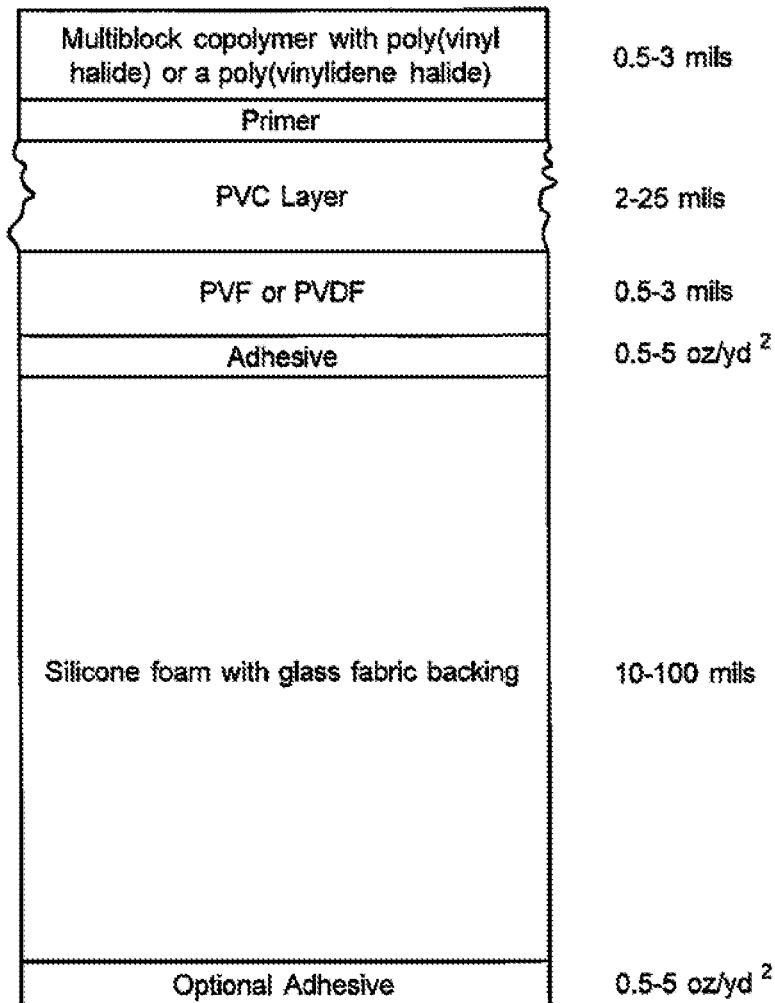
FIG. 3 is a schematic representation of a third embodiment of a laminate of the present disclosure.

The present invention is an engineered high performance decorative laminate that has a soft feel, for example like leather or synthetic leather. It will meet or exceed all Federal Aviation Administration ("FAA") regulations. Specifications for fire, smoke and toxic gases for use in all areas of commercial aircraft are considered. It will also have excellent stain resistance and durability. By coating a poly(vinyl halide) or a poly(vinylidene halide) film with a flame retarded multiblock copolymer and optimizing this layer for feel and burn these limitations were overcome.

"Multiblock copolymers" as used herein include polyurethanes (PU), copolyamides (COPA), copolyesters (COPE), and styrenics such as SIS, SBS, SIBS and the like. These copolymers are preferably cross-linkable thermoplastics or thermosets.

"Poly(vinyl chloride)" or "PVC," as used herein, includes homopolymers of vinyl chloride, as well as polymerization products of vinyl chloride and one or more co-monomers. For example, the PVC resin can be a copolymer of vinyl chloride and ethylene, or a copolymer of vinyl chloride and propylene. The PVC resin can also be the polymerization product of vinyl chloride and an ester monomer having formula $H_2C=C(R^1)OC(=O)R^2$ or $H_2C=C(R^1)C(=O)OR^2$, where $R^1$ and $R^2$ are, independently, $C_{1-12}$ alkyl. An example of such a resin is a copolymer of a vinyl chloride monomer and a methyl methacrylate monomer. Another example of such a resin is a copolymer of a vinyl chloride monomer and a vinyl acetate monomer. Combinations of these PVC resins may also be used.

"Poly(vinylidene fluoride)" or "PVDF," as used herein, includes homopolymers of vinylidene floride, as well as polymerization products of vinylidene fluoride and one or more co-monomers. For example, the PVDF resin can be a copolymer of vinylidene fluoride and hexafluoropropylene, or a copolymer of vinylidene fluoride and chlorotrifluoroethylene. The PVDF resin can also be the polymerization product of vinylidene fluoride and an ester monomer having formula $H_2C=C(R^1)OC(=O)R^2$ or $H_2C=C(R^1)C(=O)OR^2$, where $R^1$ and $R^2$ are, independently, $C_{1-12}$ alkyl. An example of such a resin is a copolymer of a vinylidene fluoride monomer and a methyl methacrylate monomer. Another example of such a resin is a copolymer of a vinylidene fluoride monomer and a vinyl acetate monomer. Combinations of these PVDF resins may also be used. Blends of PVDF with other polymers can also be used, for example PVDF/acrylic blends.

"Prepreg" are coatings in which polymers such as PET, PPS, and PEEK are suspended in an organic liquid, optionally with flame retardants.

"Silicone foam" is a silicone material containing open and/or closed cells and are available from a variety of manufacturers. Foams are available in a wide variety of durometers and with glass backing for durability. Specifically selected and designed systems with improved flame retardant properties beyond the natural flame retardant properties of silicone based materials is required to meet the intent of the invention.

"Organosols" are coatings in which PVC is suspended in an organic liquid optionally with flame retardants.

Suitable adhesives and primers include, but are not limited to: phenolic resins, polyesters, epoxies, polyurethanes, and methacrylics. Because the adhesives need to be compatible with the materials they are bonding and provide the requisite strength for the application, typically the manufacturer of the laminate layer will specify which adhesives or primers are compatible in use with their products.

The compositions contain one or more flame retardant or combinations of flame retardants. The flame retardants can be liquid or solid. Preferred flame retardants include but are not limited to aluminum trihydroxide, available from various suppliers, including Alcoa, under the product name Hydrated Aluminas; magnesium hydroxide, available from various suppliers, including Albermarle, under the trade name MAGNIFIN (e.g., Magnifin H-10 or Magnifin H-5); flame-retardant plasticizer such as phosphate ester plasticizers, available from various suppliers, including Ferro, under the trade name SANTICIZER (e.g., Santicizer 2148), tetra-bromophthalates, polymeric plasticizers (for example, Admix 412, available from Teknor Apex), combinations of bromo and chlorophthalates (for example, Unitex 44-55), and chlorinated hydrocarbons (for example, Cercelor S52); and ammonium octamolybdate, available from various suppliers, including Polymer Additives Group, under the trade name Climax AOM; Alkyl aluminum phosphonates and phosphinates such as AMMP and DEPAL sold by ICL-IP and Clariant, respectively, zinc sulfides, sold by Sachtleben, zinc borates sold by US Borax Inc, and zinc hydroxy stannates sold as ZS 286 by 3N International; bismuth oxide, sold by 3N International. Additional flame retardants are described in Linsky et al., U.S. Pat. No. 5,886,072, and Shtekler et al., WO 2012/088080, which are hereby incorporated by reference in its entirety. The compositions preferably include at least about 50 parts total flame retardant per 100 parts polyvinyl chloride resin, and more preferably from about 50 parts to about 200 parts total flame retardant per 100 parts polyvinyl chloride resin. The composition may include, for example, from about 5 parts to about 60 parts, from about 10 parts to about 50 parts, or from about 20 parts to about 40 parts flame retardant plasticizer per 100 parts polyvinyl chloride resin.

In one embodiment of the present invention, as schematically illustrated in FIG. 2, the laminate comprises a top layer of clear flame retarded multiblock copolymer film bonded to a clear poly(vinyl halide) or a poly(vinylidene halide) film, optionally containing fire retardants. This laminate is then bonded to a flame retarded PVC layer containing pigments and flame retardants. It may be necessary to use a primer in order to attain good adhesion between the laminate and the PVC layer. These layers are bonded with a suitable glass fabric that has been impregnated with a fused organosol material. Optionally there may be a fluoropolymer layer bonded to the other side of the impregnated glass in which case an optional primer layer would be required. Commercially available examples of suitable materials for this embodiment are set forth below:

|  |  | FAA specification | Soft Touch Film | | | | | | | |
|---|---|---|---|---|---|---|---|---|---|---|
|  |  |  | 1 | 2 | 3 | 4 | 5 | 6 | 7 | 8 |
| OSU Heat Release | Peak kw/m$^2$ | 65 | 62 | 76 | 53 | 59 | 71 | 43 | 49 | 53 |
|  | Total kw × min/m$^2$ | 65 | 51 | 50 | 49 | 44 | 37 | 44 | 37 | 42 |
| Smoke | Ds 4 min | 200 | 99 | 126 | 94 | 97 | 86 | 104 | 121 | 100 |

The soft touch film is a grade of Aerofine available from Akzo Nobel, preferably the 8901 that is 2.5-2.7 mils thick and is composed of a polyurethane over a PVC base. The glass fiber is sold as 7628 Greige glass from BGF. The middle PVC layer was S1670 sold by Spectrum. The prepreg was S1687 sold by Spectrum. The acrylic primer is 68080 a flexible product adhesive sold by Dupont.

In another embodiment of the present invention the laminate comprises a top layer of clear urethane/polycarbonate film bonded to a clear PVDF/acrylic film containing fire retardants which is then bonded to a PVC layer containing pigments and flame retardants. These layers are bonded with a suitable adhesive to a fire resistant silicone foam/glass fabric. Optionally there may be a fluoropolymer layer between the PVC layer and the silicone foam.

Referring to FIG. 1, in this embodiment the laminate comprises a top ply of a clear layer that is about from 0.5 mil to about 3 mil of a flame retarded multiblock copolymer on a poly(vinyl halide) or a poly(vinylidene halide) layer. Suitable films are, for example sold as Aerofine 8900 by Akzo Nobel. Optionally bound to the top ply using a suitable primer up to 0.5 mil in thickness. The prior materials are then bonded to a PVC layer that is 1 to 25 mil in thickness which can be foamed or unfoamed. An organosol impregnated glass fabric is optionally bound to the PVC layer, wherein the glass fabric weighs from about 1 to about 10 oz/yd$^2$, and the organosol is fused. A fluoropolymer layer (PVF or PVDF) such as Tedlar® offered by Dupont or Fluorex® products offered by Akzo Nobel is optionally indirectly bonded to PVC, indirectly as a primer layer is required to be used in conjunction with the optional fluoropolymer layer. The fluoropolymer layer is preferably from about 0.5-3.0 mils thick. An adhesive layer is then bonded as the final layer; the adhesive layer is preferably 1 to 5 oz/yd$^2$.

Referring to FIG. 3, in this embodiment the laminate comprises a top ply of clear 1.0-3 mil urethane/polycarbonate film. Suitable films are manufactured by Akzo Nobel. Bound to the top ply using a suitable adhesive, such as Dupont 68080 adhesive primer, is a 0.8-1.5 mil clear PVDF/acrylic film containing fire retardants such as Airfilm LHR (Low Heat Release) offered by Schneller. The prior materials are then bonded to a fluoropolymer layer (PVF or PVDF) such as Tedlar® offered by Dupont of Soliant products offered by Akzo Nobel. The fluoropolymer layer is preferably from about 0.5-2.0 mils thick. A silicone foam with glass backing is bound to the fluoropolymer layer using a suitable adhesive such as HA 211 from Schneller. In one embodiment the silicone foam is 63 mils thick. Suitable silicone foams can be purchased from Rogers Corporation under the brand Bisco®.

Figure 4:
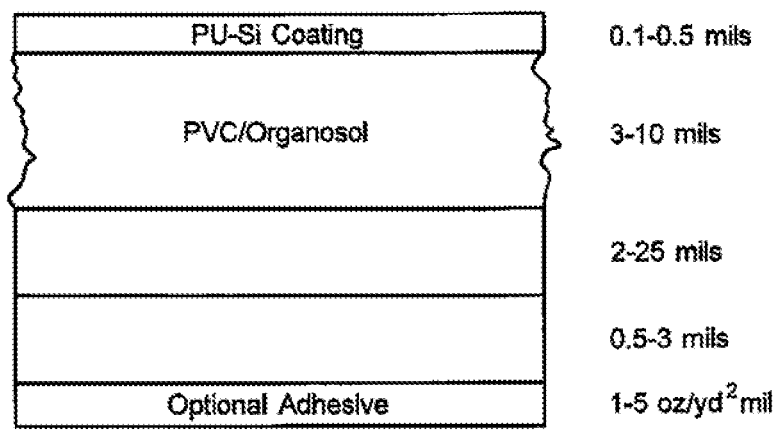
FIG. 4 is a schematic representation of a fourth embodiment of a laminate of the present disclosure.

Referring to FIG. 4, in this embodiment the laminate comprises a fluoropolymer backing such as PVDF or PVF onto which a PVC material from 2-10 mils in thickness is applied. The PVC can be calendared, extruded or coated; it may contain pigments for coloration and fire retardants. In some instances it may be comprised of a couple of different layers of PVC and some or all of it may be foamed. A top ply of 0.1-0.5 mils polyurethane/silicone is applied to the PVC.

Table 1 below sets forth the desired characteristics for the laminates of the present invention including relevant regulations where applicable.

Laminates of the present invention can be applied by any suitable means. In certain instances they may be vacuum formed into place using means known in the art or applied using rollers or other means of exterior pressure.

One of skill in the art will appreciate that a substantial degree of deviation from the processes and materials described herein is possible and still be within the spirit of the invention.

TABLE 1

| Targets plus team inputs | Test method | Characteristics |
|---|---|---|
| 1 With Pressure sensitive adhesive | Adhesion (ISO 4578) and burn (FAA), 65/65/200 and FAA and OEM toxicity | |
| 2 With Heat active adhesives | | |
| 3 Resistance to cleaning agent Durability | AIMS 04-09-000, AIMS 04-09-001 and typical house cleaning agents | |
| 4 | Tensile and elongation ISO 527 | min. 70N. 60 to 80% |
| 5 | Tear ISO 4674 | min. 0.8N |
| 6 | Dimensional changes AIMS 04-09-000 | less than 1.5% change after 75° C. for 24 h. |
| 7 | Taber weight loss. ISO 9352 | 10 to 20 mg loss |
| 8 | Five fingers scratch or ASTM 7027 | visually as good as our laminates |
| 9 60 sec Vertical Burn | FAR 25.853 | 150, 10, 0 |
| 10 NBS smoke density | | <200 |
| 11 OSU | | Peak/total: 65/65, all substrate and all adhesives |
| 12 Toxicity | ABD 0031, vs Boeing D6-51377 | Hydrogen Fluoride < 100/200 ppm Hydrogen chloride < 150/500 ppm Hydrogen cyanide < 150/150 ppm Sulfur dioxide < 100/100 ppm Nitrous gases < 100/100 ppm Carbon monoxide < 1000 ppm |

What is claimed is:

1. A laminate material comprising:
   a) a top layer comprising at least one layer of a multiblock copolymer comprising a first layer of a cross-linkable thermoplastic or thermoset copolyamide, copolyester, styrenic or polyurethane;
   b) a bottom layer comprising at least one layer of a poly(vinyl halide) or a poly(vinylidene halide), a primer layer adjacent the at least one layer of a poly(vinyl halide) or a poly(vinylidene halide), at least one layer of PVC and at least one impregnated glass fabric layer on the bottom of the at least one layer of PVC, a primer layer adjacent the at least one impregnated glass fabric layer, and at least one layer of a poly(vinyl fluoride) or a poly(vinylidene fluoride) adjacent the impregnated glass fabric layer; and wherein the laminate further comprises at least one flame retardant and has an OSU Heat Release Total value of <65 kW min/m$^2$ and an OSU Heat Release Peak value of <65 kW/m$^2$.

2. The laminate material of claim 1 further comprising an adhesive layer on the bottom of the poly(vinylfluoride) or poly(vinylidene fluoride) layer.

3. The laminate of claim 1 in which the bottom layer further comprises at least one layer of a poly(vinyl fluoride) or a poly(vinylidene fluoride) adjacent the primer layer adjacent the at least one impregnated glass fabric layer.

4. The laminate of claim 1 further comprising at least one flame retardant selected from the group consisting of hydrated aluminas, magnesium hydroxide, phosphate ester plasticizers, tetrabromophthalates, tetrachlorophthalates, chlorinated hydrocarbons, ammonium octamolybdate, alkyl aluminum phosphonates and phosphinates, zinc sulfides, zinc borates, zinc hydroxy stannates, and bismuth oxide.

5. A laminate material comprising:
   a) a top layer comprising at least one layer of a multiblock copolymer comprising a first layer of a cross-linkable thermoplastic or thermoset copolyamide, copolyester, styrenic or polyurethane; and
   b) a bottom layer comprising at least one layer of a poly(vinyl halide) or a poly(vinylidene halide), at least one layer of a PVC adjacent the at least one layer of a poly(vinyl halide) or a poly(vinylidene halide) and at least one layer of a poly(vinyl fluoride) or a poly(vinylidene fluoride) adjacent the layer of PVC.

6. The laminate of claim 5 wherein,
   the bottom layer further comprises a primer layer adjacent the at least one layer of a poly(vinyl halide) or a poly(vinylidene halide).

7. The laminate material of claim 6 further comprising a primer layer adjacent adhesive layer on the bottom of the poly(vinylfluoride) or poly(vinylidene fluoride) layer.

8. The laminate material of claim 6 further comprising at least one primer layer adjacent the at least one layer of a poly(vinyl fluoride) or a poly(vinylidene fluoride).

9. The laminate material of claim 8 further comprising an adhesive layer on the bottom of the at least one poly(vinylfluoride) or poly(vinylidene fluoride) layer.

10. The laminate of claim 5 further comprising an adhesive layer on the bottom of the at least one poly(vinylfluoride) or poly(vinylidene fluoride) layer.

11. The laminate of claim 10 further comprising at least one layer of primer above the at least one poly(vinylfluoride) or poly(vinylidene fluoride) layer.

12. The laminate of claim 5 further comprising at least one layer of primer above the at least one poly(vinylfluoride) or poly(vinylidene fluoride) layer.

13. The laminate of claim 5 further comprising at least one the flame retardant selected from the group consisting of hydrated aluminas, magnesium hydroxide, phosphate ester plasticizers, tetrabromophthalates, tetrachlorophthalates, chlorinated hydrocarbons, ammonium octamolybdate, alkyl aluminum phosphonates and phosphinates, zinc sulfides, zinc borates, zinc hydroxy stannates, and bismuth oxide, and the laminate having an OSU Heat Release Total value of <65 kW min/m$^2$ and an OSU Heat Release Peak value of <65 kW/m$^2$.

* * * * *